(12) United States Patent
Sasaki (10) Patent No.: US 8,807,369 B2
(45) Date of Patent: Aug. 19, 2014

(54) FUEL-FILLING APERTURE OPEN-CLOSING DEVICE

(75) Inventor: Hiroshi Sasaki, Yokohama (JP)

(73) Assignee: NIFCO Inc., Yokohama-shi (JP)

(*) Notice: Subject to any disclaimer, the term of this patent is extended or adjusted under 35 U.S.C. 154(b) by 0 days.

(21) Appl. No.: 13/983,897

(22) PCT Filed: Jan. 5, 2012

(86) PCT No.: PCT/JP2012/000031
§ 371 (c)(1),
(2), (4) Date: Aug. 30, 2013

(87) PCT Pub. No.: WO2012/108118
PCT Pub. Date: Aug. 16, 2012

(65) Prior Publication Data
US 2013/0341326 A1  Dec. 26, 2013

(30) Foreign Application Priority Data
Feb. 7, 2011 (JP) ................. 2011-023551

(51) Int. Cl.
*B65B 3/00* (2006.01)
*B60K 15/04* (2006.01)
*B60K 15/05* (2006.01)

(52) U.S. Cl.
CPC ......... *B60K 15/04* (2013.01); *B60K 2015/0429* (2013.01); *B60K 15/05* (2013.01); *B60K 2015/0461* (2013.01)
USPC .................... 220/86.2; 220/746; 220/203.01; 137/588; 137/527; 141/350; 296/97.22

(58) Field of Classification Search
CPC ........... B60K 15/0406; B60K 15/0409; B60K 15/05; F01M 2011/0491; B67D 7/04
USPC ................ 220/694, 86.1, 86.2, 746, DIG. 33, 220/367.1, 212, 203.28; 137/587, 588, 527; 141/59, 350; 296/97.22
See application file for complete search history.

(56) References Cited

U.S. PATENT DOCUMENTS

| | | | |
|---|---|---|---|
| 5,538,055 A | 7/1996 | Kunz et al. | |
| 6,367,520 B1 * | 4/2002 | Palvolgyi et al. | 141/289 |
| 6,755,057 B2 * | 6/2004 | Foltz | 70/159 |
| 6,880,594 B1 * | 4/2005 | Benjey | 141/350 |
| 6,886,613 B1 * | 5/2005 | Zahdeh | 141/286 |
| 2010/0218849 A1 | 9/2010 | Hagano | |

FOREIGN PATENT DOCUMENTS

| | | |
|---|---|---|
| JP | H05-032065 U | 4/1993 |
| JP | 2007-261492 A | 10/2007 |
| JP | 2010-195344 A | 9/2010 |

* cited by examiner

*Primary Examiner* — Robert J Hicks
*Assistant Examiner* — Kareen Rush
(74) *Attorney, Agent, or Firm* — Manabu Kanesaka (57) ABSTRACT

A fuel-filling aperture open-closing device provided in a filler pipe communicated with a fuel tank includes a tube member forming a pathway and connected to one end of the filler pipe, and a valve body rotatably provided inside the pathway, blocking the pathway by an urging member, and opening the pathway when rotating to an inner end side of the pathway by being pressed by a fuel-filling nozzle inserted into the pathway. The tube member includes a discharge hole communicating an outer surface with an inner surface of the tube member in a portion in which an outer surface of a lateral circumferential portion thereof faces downward, and corresponding to a portion on the outer end side in a closed position of the valve body. The valve body includes a plurality of discharge grooves extending toward the discharge hole in a portion on the outer end side.

4 Claims, 9 Drawing Sheets

FUEL-FILLING APERTURE OPEN-CLOSING DEVICE

RELATED APPLICATIONS

The present application is National Phase of International Application No. PCT/JP2012/000031 filed Jan. 5, 2012, and claims priority from Japanese Application No. 2011-023551, filed Feb. 7, 2011.

FIELD OF TECHNOLOGY

The present invention relates to a fuel-filling aperture opening-closing device which opens and closes a fuel-filling aperture of an automobile and the like.

BACKGROUND ART

Conventionally, in the automobile and the like, there is a fuel-filling aperture opening-closing device which blocks the fuel-filling aperture formed in one end of a filler pipe by a screw type filler cap. In such fuel-filling aperture, at each fuel filling, the filler cap has to be removed and put on so as to require additional work. Also, sometimes there occurs a mistake of forgetting to put on the removed filler cap. In order to solve the aforementioned problem of the fuel-filling aperture, there is a fuel-filling aperture opening-closing device which openably and closably blocks the fuel-filling aperture by a flap valve, which can be opened by inserting a fuel-filling nozzle (for example, Patent Document 1).

PRIOR ART DOCUMENT

Patent Document

Patent Document 1: Japanese Unexamined Patent Publication No. 2010-195344

DISCLOSURE OF THE INVENTION

Problems to be Solved by the Invention

In the fuel-filling aperture opening-closing device described in the Patent Document 1, however, the flap valve is exteriorly exposed, so that foreign matters such as rainwater, dust, and the like easily remain on an outer surface (a face facing an opening end side of the fuel-filling aperture) of the flap valve, and in a case of pushing open the flap valve disposed inside a pathway by an end of the fuel-filling nozzle, the flap valve opens, and the foreign matters fall into the filler pipe, and are attached to the end of the fuel-filling nozzle, so that there is a possibility that the foreign matters are washed into the filler pipe together with a fuel injection.

The present invention is made in view of the aforementioned background, and an object of the present invention is to reduce the foreign matters mixing into the filler pipe from a fuel-filling aperture opening-closing device which opens the pathway by inserting the fuel-filling nozzle.

Means for Solving the Problems

In order to obtain the aforementioned object, the present invention is a fuel-filling aperture open-closing device (1) provided in one end of a filler pipe and (2) communicated with a fuel tank. The fuel-filling aperture open-closing device (1) comprises a tube member (3) internally forming a pathway (4), and connected to one end of the filler pipe in such a way that an axis line (Z) has an angle relative to a vertical direction (V); and a valve body (22) rotatably provided inside the pathway, closing the pathway by being constantly urged to an outer end side of the pathway by an urging member (50), and opening the pathway when rotating to an inner end side of the pathway against an urging force of the urging member by being pressed by a fuel-filling nozzle (100) inserted into the pathway from the outer end side. The tube member includes a discharge hole (52) communicating an outer surface with an inner surface of the tube member in a portion in which an outer surface of a lateral circumferential portion thereof faces downward, and a portion corresponding to a portion on the outer end side in a closed position of the valve body in an axis line direction of the tube member. The valve body includes a plurality of discharge grooves (42) extending toward the discharge hole in the portion on the outer end side.

According to the configuration, foreign matters present on the outer end side in the axis line direction of the tube member of a first valve body are discharged outside the filler pipe through the discharge hole. At that time, the foreign matters are guided to the discharge hole by the discharge grooves so as to be discharged efficiently. Also, since a plurality of the discharge grooves is formed on a surface of the valve body, when the valve body is pushed open by the fuel-filling nozzle, a contact (slidingly contact) area between an end portion of the fuel-filling nozzle and the valve body decreases so as to reduce the foreign matters attached to the end portion of the fuel-filling nozzle from the valve body.

Another aspect of the present invention is that the tube member is integrally formed with the filler pipe.

According to the configuration, by using the filler pipe, the number of components can be reduced.

Another aspect of the present invention is that from a view in the axis line direction of the tube member, a rotation axis of the valve body is roughly orthogonal to an extending direction of the discharge grooves.

According to the configuration, when the fuel-filling nozzle pushes to open the valve body, the fuel-filling nozzle will never be caught in the discharge grooves.

Another aspect of the present invention is that there is additionally included an auxiliary valve body (55) rotatably provided on an outer end side more than the valve body inside the pathway, blocking the pathway by being urged to the outer end side of the pathway by an urging member (65) at a normal time, and opening the pathway by rotating to the inner end side of the pathway against an urging force of the urging member by being pressed by the fuel-filling nozzle inserted into the pathway from the outer end side.

According to the configuration, due to the auxiliary valve body, it becomes difficult for the foreign matters to be attached to the valve body having the discharge grooves.

Effect of the Invention

According to the aforementioned configuration, in the fuel-filling aperture open-closing device which opens the pathway by inserting the fuel-filling nozzle, the foreign matters mixed into the filler pipe from the fuel-filling aperture open-closing device can be reduced.

BEST MODE OF CARRYING OUT THE INVENTION

Hereinafter, with reference to drawings, an embodiment of the present invention applied to a fuel-filling aperture open-closing device provided in a fuel-filling aperture of an automobile will be explained in detail. In the following explanation, an up-and-down direction represents a direction along a vertical line V shown in FIG. 2.

Figure 1:
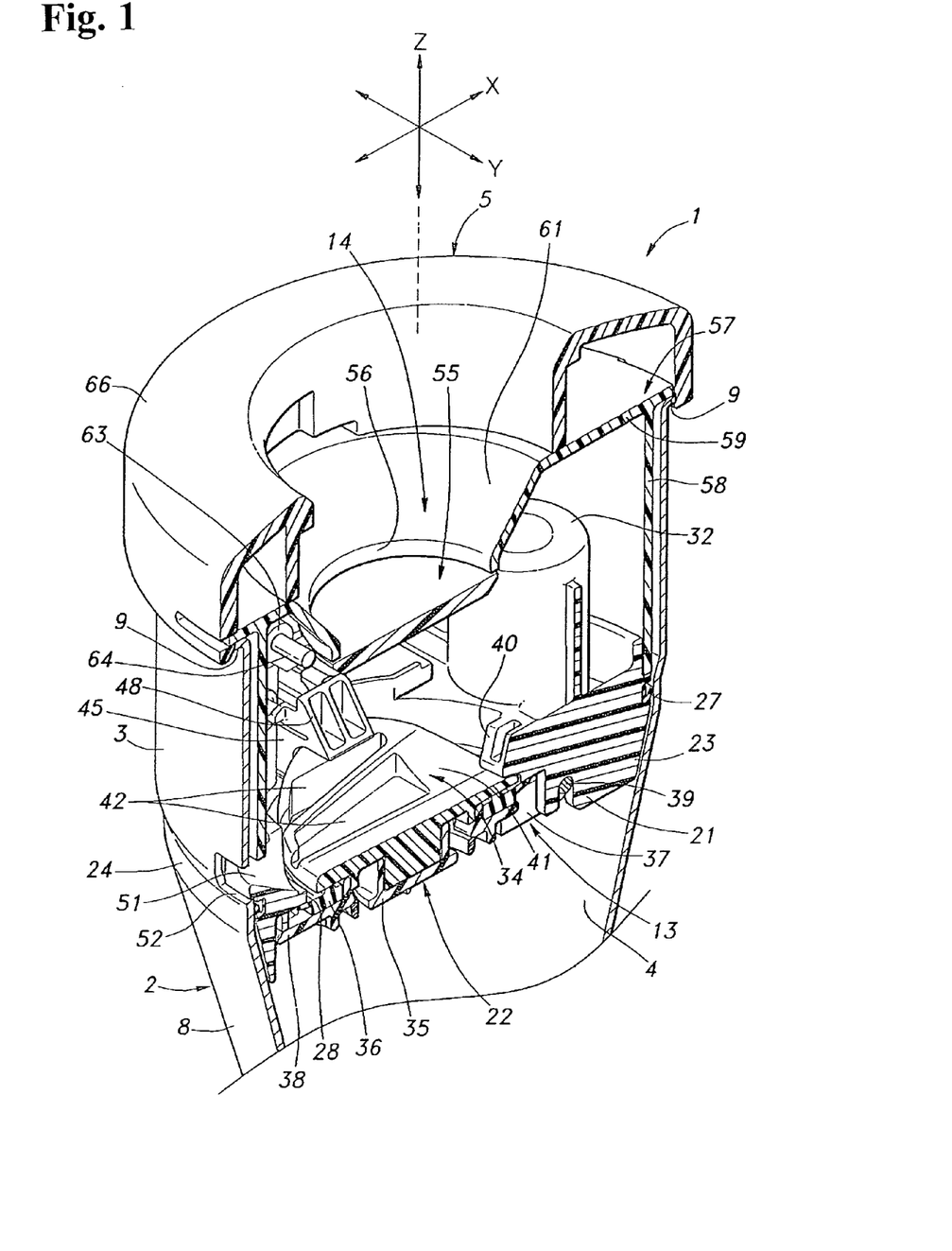
FIG. 1 is a partially broken perspective view showing a fuel-filling aperture open-closing device.
Figure 2:
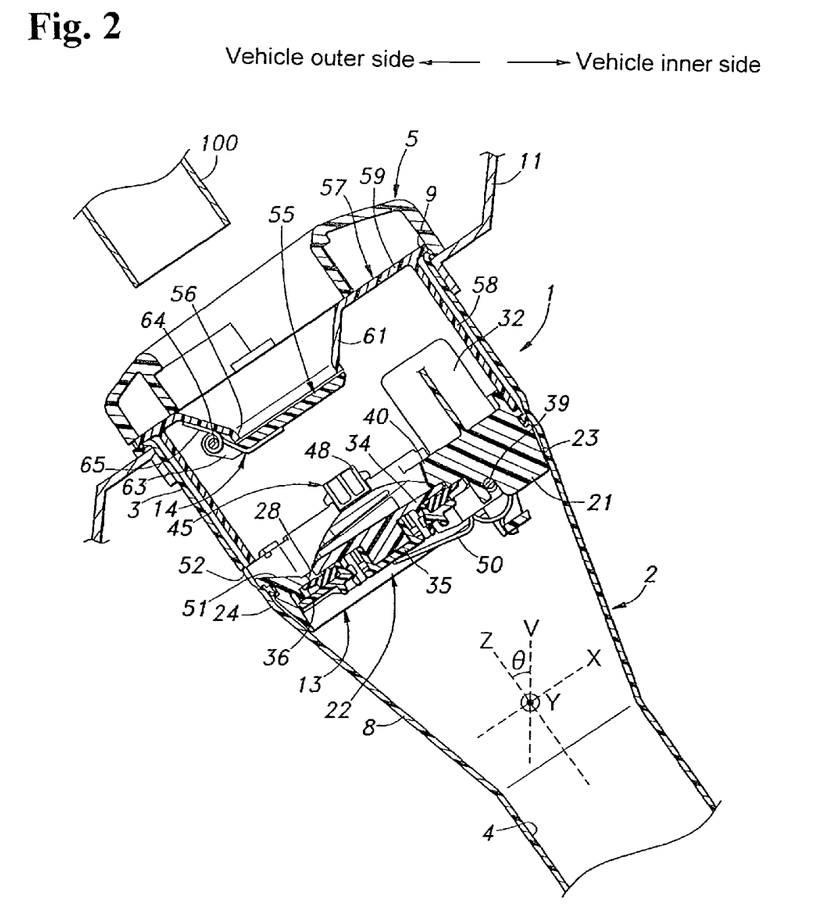
FIG. 2 is a cross-sectional view showing a state wherein the fuel-filling aperture open-closing device is disposed in an auto body.

As shown in FIG. 1 and FIG. 2, a fuel-filling aperture open-closing device 1 is provided in an outer end of a filler pipe 2 connected to a fuel tank which is not shown in the figures; blocks the outer end of the filler pipe 2 at a normal time; and meanwhile opens the outer end of the filler pipe 2 when a fuel-filling nozzle 100 having an appropriate diameter is inserted. In the filler pipe 2, as a standard of a longitudinal direction, an end portion side, which becomes the fuel-filling aperture, is made as an outer end side, and an end portion side connected to the fuel tank is made as an inner end side. As shown in FIG. 1, the fuel-filling aperture open-closing device 1 includes a tube portion (a tube member) 3 configuring the outer end of the filler pipe 2; and a valve device assembly body 5 inserted into an opening end of the tube portion 3, and openably and closably blocking a pathway 4 formed inside the tube portion 3.

The filler pipe 2 is a metallic pipe material, and includes an expanding diameter portion 8 having a circular truncated cone shape gradually expanding a diameter as moving to the outer end side. The tube portion 3 continues to the outer end side of the expanding diameter portion 8. The tube portion 3 has a cylindrical shape, and there is formed the opening end on the outer end side. In the opening end of the tube portion 3, there is formed an outward flange portion 9. In the present embodiment, although the tube portion 3 is configured as one portion of the filler pipe 2, in another embodiment, the tube portion 3 may be configured in a separate member from the filler pipe 2, and the tube portion 3 may be combined with the filler pipe 2. In that case, the tube portion 3 may be formed by a resin material.

As shown in FIG. 2, given that an axis line of the tube portion 3 is Z, the tube portion 3 is attached to an auto body panel 11 in such a way that an angle θ between the vertical line V and the axis. line Z becomes larger than 0 degree. The angle θ is preferred to be, for example, 30 to 80 degrees. Also, for the sake of explanation, a line of intersection between a planar surface (a horizontal cross-sectional surface of the tube portion 3) orthogonal to the axis line Z and a planar surface including the axis line Z and the vertical line V is made as an axis line X; and a line of intersection between a planar surface orthogonal to the axis line X and a planar surface orthogonal to the axis line Z is made as an axis line Y.

In the valve device assembly body 5, a first valve device 13 and a second valve device 14, which are respectively a flap type valve, are disposed in series. In a state wherein the valve device assembly body 5 has been inserted into the opening end of the tube portion 3, the second valve device 14 is disposed on an outer end side rather than the first valve device 13.

The first valve device 13 includes a base member 21, and a first valve body 22 rotatably supported in the base member 21, as main elements. The base member 21 has a disk shape with a thickness, and an outer circumferential portion 23 thereof is formed in a shape that can be engaged with an inner circumferential surface of a border portion 24 between the tube portion 3 and the expanding diameter portion 8. Namely, the outer circumferential portion 23 of the base member 21 includes a tapered portion (a circular truncated cone portion) fitting into an inner surface of the expanding diameter portion 8, and the tapered portion fits into the expanding diameter portion 8 so as to be positioned inside the filler pipe 2. Also, in the outer circumferential portion 23 of the base member 21, there is formed an annular seal groove 26 (see FIG. 5) extending in a circumferential direction, and in the seal groove 26, there is installed an annular seal member 27. The seal member 27 seals a gap between the base member 21 and an inner surface of the filler pipe 2 closely.

Figure 3:
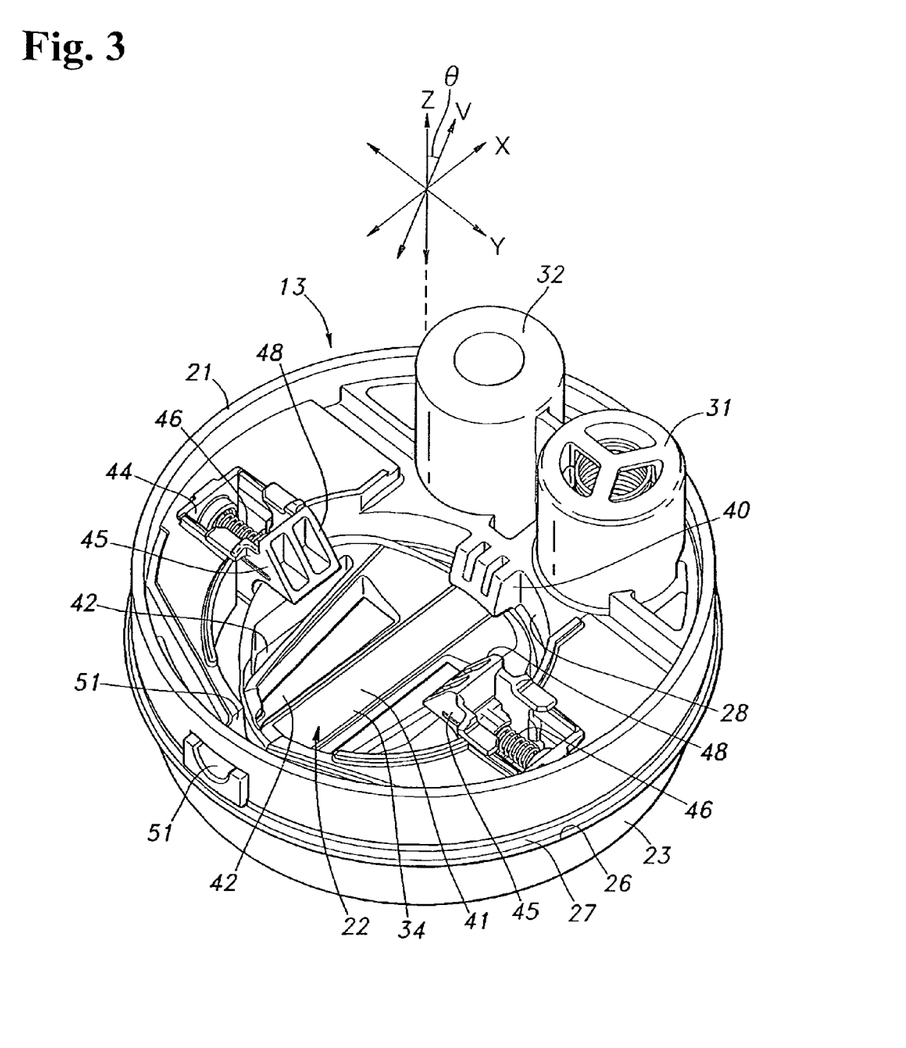
FIG. 3 is a perspective view showing a first valve device.

As shown in FIG. 2 and FIG. 3, in a state wherein the base member 21 has been attached into the filler pipe 2, in a portion between a lower half portion and a center portion in an axis line X direction of the base member 21, there is formed a first pathway 28 passing through the base member 21 in a thickness direction (an axis line Z direction). In an upper half portion in the axis line X direction of the base member 21, there are provided a positive pressure valve 31 and a negative pressure valve 32. The positive pressure valve 31 and the negative pressure valve 32 respectively include a pathway communicating an inner end side with an outer end side of the base member 21; a valve seat provided inside the pathway; a valve body seated in the valve seat and blocking the pathway; and a compression coil spring urging the valve body to a valve seat side. In the positive pressure valve 31, in a case wherein the inner end side of the base member 21 has become a positive pressure with a predetermined value or above, the pressure moves the valve body in a direction separating from the valve seat against an urging force of the compression coil spring to open the pathway so as to decrease the pressure on the inner end side of the base member 21. On the other hand, in the negative pressure valve 32, in a case wherein the inner end side of the base member 21 has become a negative pressure with a predetermined value or less, the pressure moves the valve body in the direction separating from the valve seat against the urging force of the compression coil spring to open the pathway so as to increase the pressure on the inner end side of the base member 21. Due to operations of the positive pressure valve 31 and the negative pressure valve 32, the inner end side of the base member 21 is prevented from becoming a high pressure with a predetermined value or above, or a low pressure with a predetermined value or above.

Figure 4:
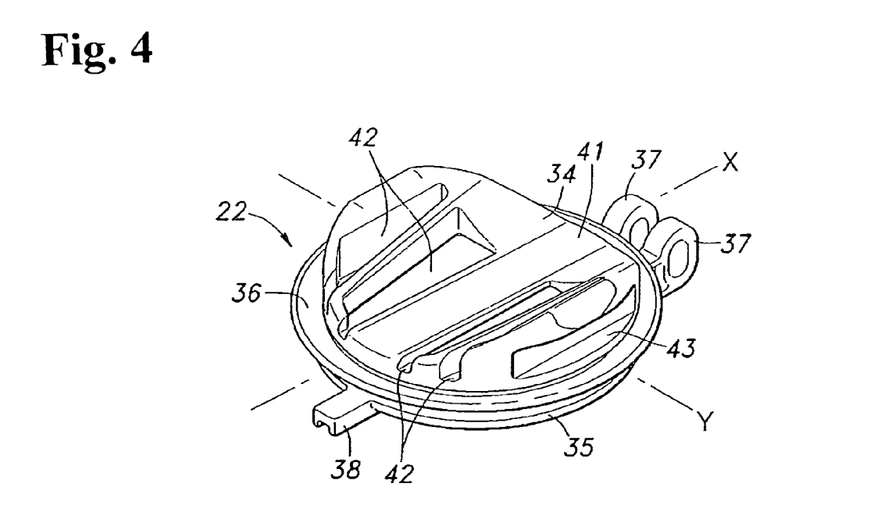
FIG. 4 is a perspective view showing the first valve body.

The first valve body 22 is used for blocking the first pathway 28; is configured by mutually overlapping and combining a first circular plate 34 with a second circular plate 35; and between the first circular plate 34 and the second circular plate 35, there is clamped an annular seal member 36 whose outer diameter is larger than that of the first circular plate 34. An outer circumferential portion of the seal member 36 protrudes outward in a radial direction from circumferential edge portions of the first circular plate 34 and the second circular plate 35 so as to form an annular lip piece having a flexibility. Given that each direction is set up as shown in FIG. 3 and FIG. 4 as a standard of a state wherein the first valve body 22 has blocked the first pathway 28, in one circumferential edge portion in an axis line X direction of the second circular plate 35, there is mutually projected a pair of bearings 37. In the other circumferential edge portion, there is projected a stopper 38 which is a projecting piece. In the pair of bearings 37, respective axis lines are parallel to an axis line Y direction, and the pair of bearings 37 mutually has the same axis.

In a portion which is the inner end side of the base member 21, and which is positioned on an upper side in an axis line X direction of the first pathway 28, there is provided a support axis 39 extending in the axis line Y direction. The pair of bearings 37 is pivotally supported at the support axis 39, so that the first valve body 22 is rotatably supported relative to the base member 21. The first valve body 22 rotates as a rotation axis of the support axis 39 so as to block the first pathway 28. In a state of a closed position wherein the first valve body 22 blocks the first pathway 28, the first circular plate 34 is disposed on an outer end side, and enters into the first pathway 28. Also, the second circular plate 35 is disposed on an inner end side of the first circular plate 34, and the seal member 36 abuts against a circumferential edge portion on an inner end side of the first pathway 28 so as to seal a gap between the first circular plate 34 and the first pathway 28. At that time, the stopper 38 of the second circular plate 35 abuts against an inner end side portion of the first pathway 28. Also, the first circular plate 34 abuts against a claw portion 40 projected on a wall surface of the first pathway 28 so as to set the closed position of the first valve body 22. A first torsion spring 50 is installed between the second circular plate 35 and the base member 21, and the first valve body 22 is constantly urged to the closed position.

As shown in FIG. 4, a surface 41 of the first circular plate 34 has a concave surface which increases (protrudes to the outer end side) a thickness as moving to both sides in the axis line Y direction from a center portion. Also, on the surface 41 of the first circular plate 34, there is formed a plurality of discharge grooves 42 extending in the axis line X direction. Each discharge groove 42 is communicated with an end surface of the first circular plate 34. on a side (i.e., a downside in the axis line X direction of the first valve body 22) wherein the stopper 38 is provided in the axis line X direction. In each discharge groove 42, a side (i.e., an upside in the axis line X direction of the first valve body 22) wherein the bearings 37 are provided in the axis line X direction may be communicated with the end surface of the first circular plate 34, or as shown in FIG. 4, may form a terminal end in the center portion of the first circular plate 34. On both end surfaces in the axis line Y direction of the first circular plate 34, there are respectively formed engagement holes 43 concaved to a center side of the first circular plate 34.

In an outer end side portion of the base member 21, there is formed a pair of guide grooves 44 communicated in such a way as to sandwich from the axis line Y direction in an outer end side portion of the first pathway 28. In the guide groove 44, a lock member 45 is slidably provided along the guide groove 44. In the axis line Y direction, the lock member 45 can slide between a position wherein one portion of the lock member 45 protrudes into the first pathway 28 and a position wherein the whole lock member 45 enters into the guide groove 44. Also, inside the guide groove 44, there is provided a compression coil spring 46, and the lock member 45 is constantly urged to a first pathway 28 side by the compression coil spring 46.

In a portion facing the first pathway 28 side of the lock member 45, there is formed an engagement convex portion 47 which can enter into the engagement hole 43 of the first circular plate 34. Also, in portions facing the first pathway 28 side of the lock member 45, and on an outer end side and an inner end side of the engagement convex portion 47, there are formed cam portions 48 and 49 which are tapered surfaces. In a case wherein the first valve body 22 is in the closed position, the lock member 45 engages with the engagement hole 43 of the first valve body 22 in the engagement convex portion 47 so as to control the first valve body 22 in the closed position. On the other hand, when the lock member 45 receives a load to the inner end side in the cam portion 48, the lock member 45 moves backward in a direction entering into the guide groove 44 to release an engagement between the engagement convex portion 47 and the engagement hole 43 so as to allow a rotation of the first valve body 22.

In an outer end side portion of the base member 21, there is formed a discharge pathway 51 extending in the axis line X direction to communicate a lower portion in the axis line X direction of the first pathway 28 with the outer circumferential portion 23 of the base member 21. The discharge pathway 51 is formed in a groove shape wherein a portion communicated with the first pathway 28 is open to the outer end side. As shown in FIG. 1 and FIG. 2, in a portion opposed to the discharge pathway 51 of the filler pipe 2, there is formed a discharge hole 52 which is a through-hole. Due to the aforementioned configuration, inside the filler pipe 2, a liquid, which has entered up to an outer end side surface of the base member 21, flows downward in the axis line X direction due to an incline of the base member 21, and is collected in the discharge pathway 51 so as to be discharged to an outside of the filler pipe 2 through the discharge hole 52. The first pathway 28 blocked by the first valve body 22 forms a concave portion in the outer end side portion of the base member 21. However, the discharge pathway 51 is communicated with the first pathway 28, so that the liquid collected in the first pathway 28 can be reliably discharged through the discharge pathway 51 as well.

The second valve device 14 includes a second valve body (an auxiliary valve body) 55, and a casing 57 including a second pathway 56 blocked by the second valve body 55. The casing 57 includes a cylindrical portion 58 formed in a size that can be inserted in the same axis as the tube portion 3 of the filler pipe 2. An inner end side edge portion of the cylindrical portion 58 is combined with an outer end side portion of the outer circumferential portion 23 of the base member 21, and in an outer end side edge portion, there is formed a bulkhead portion 59 forming the second pathway 56. The bulkhead portion 59 has a disk shape extending along a surface orthogonal to the axis line Z, and a circumferential edge portion thereof protrudes outward in a radial direction more than an outer circumferential surface of the cylindrical portion 58, and abuts against the flange portion 9 on the outer end of the filler pipe 2. The second pathway 56 is a circular through-hole formed in a protruding end of a guide portion 61 bulged in a circular truncated cone shape from the bulkhead portion 59 to an inner end side, and is disposed in a position which becomes the same axis as the first pathway 28 from a view in a direction along the axis line Z. A diameter of the second pathway 56 is set smaller than a diameter of the first pathway 28. The guide portion 61 has a function guiding the fuel-filling nozzle 100 inserted from the outside of the filler pipe 2 to the second pathway 56.

The second valve body 55 is a disk-shaped member comprising a bearing 63 in a circumferential edge portion, and the bearing 63 is pivotally supported at a support axis 64 provided in an inner end side portion of the bulkhead portion so as to be rotatably supported in the casing 57. The second valve body 55 can rotate between a closed position blocking the second pathway 56 by abutting against a circumferential edge portion on the inner end side of the second pathway 56, and an open position which does not overlap with the second pathway 56 from the view in the direction along the axis line Z. Also, a second torsion spring 65 is installed between the second valve body 55 and the bulkhead portion 59, and the second valve body 55 is constantly urged to the closed position.

On an outer end side of the bulkhead portion 59, there is attached an annular garnish 66 whose inner diameter roughly corresponds to an outer diameter of the guide portion 61, and whose outer diameter roughly corresponds to an outer diameter of the bulkhead portion 59. The garnish 66 enhances a design property of the fuel-filling aperture open-closing device 1, and protects the bulkhead portion 59.

In the present embodiment, the first valve device 13 and the second valve device 14 are formed by a resin material except for the compression coil springs 46, a first torsion spring 50, and the second torsion spring 65. The first valve device 13 and the second valve device 14 form the valve device assembly body 5 as one unit combined beforehand, and the valve device assembly body 5 is inserted into the tube portion 3 of the filler pipe 2 so as to configure the fuel-filling aperture open-closing device 1. In another embodiment, the tube portion 3 may be configured as a resin molded article of the separate member from the filler pipe 2, and the fuel-filling aperture open-closing device 1 may be configured by combining the first valve device 13, the second valve device 14, and the tube portion 3 beforehand, so that the fuel-filling aperture open-closing device 1 may be connected to the outer end of the filler pipe 2.

A distance in an axis line Z direction between the first valve device 13 and the second valve device 14 is arranged by being approached within a range wherein a rotation of the second valve body 55 is not disturbed by the first valve device (i.e., there is no first valve device 13 inside a rotation trajectory of the second valve body 55).

Figure 5:
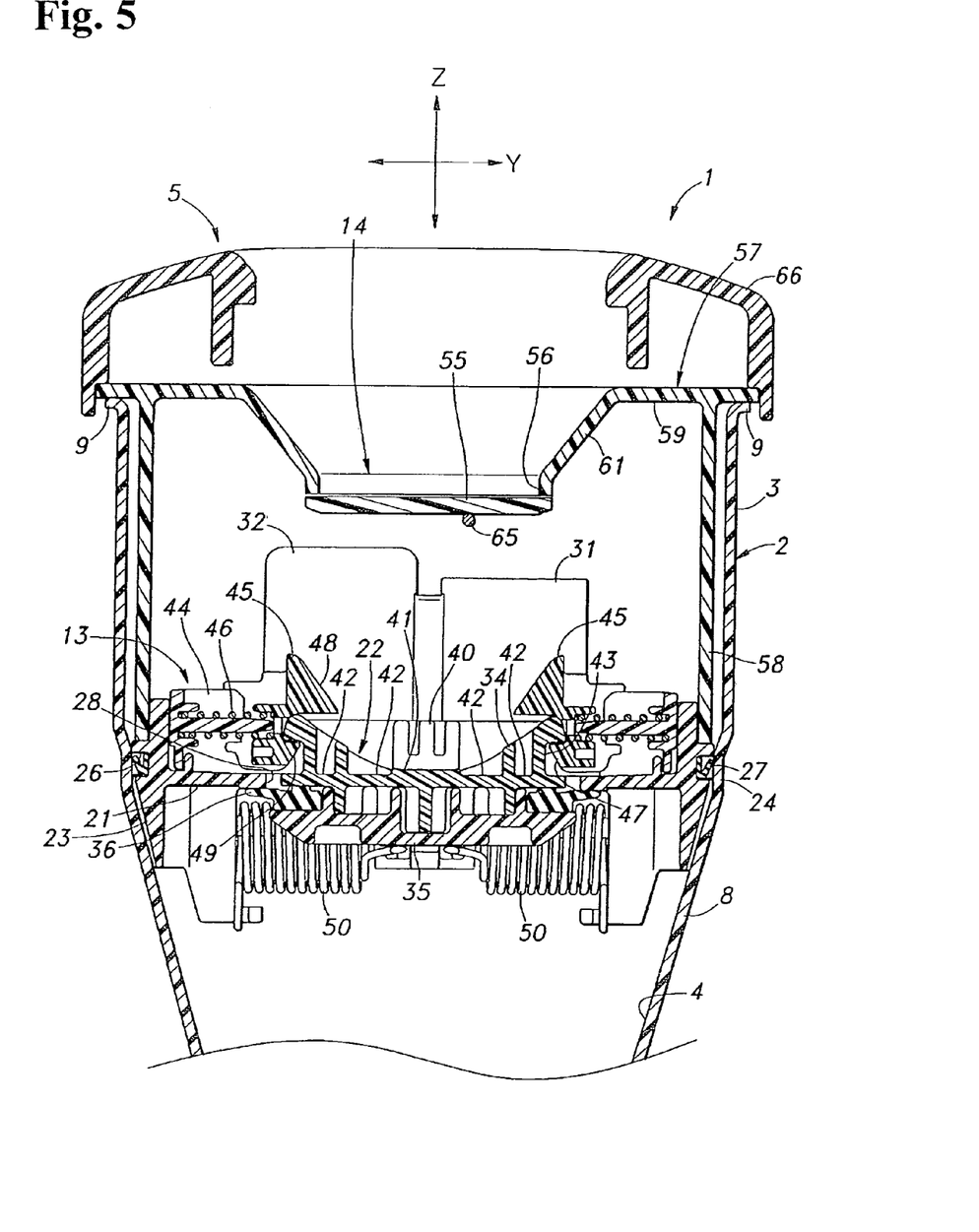
FIG. 5 is a substantial enlarged cross-sectional view showing a state wherein the first valve device and a second valve device of the fuel-filling aperture open-closing device are blocked.

Next, with reference to FIG. 5 to FIG. 8, a movement of the fuel-filling aperture open-closing device 1 will be explained. As shown in FIG. 5 (FIGS. 1 and 2), in a normal state wherein filling a fuel is not carried out by the fuel-filling nozzle 100, the first valve body 22 is urged by the first torsion spring 50 so as to block the first pathway 28, and the second valve body 55 is urged by the second torsion spring 65 so as to block the second pathway 56. Also, the pair of lock members 45 is urged by the compression coil springs 46, and is engaged with the first valve body 22 so as to control the rotation of the first valve body 22.

From the aforementioned normal state, in a case of injecting a fuel, i.e., filling a fuel into the filler pipe 2 using the fuel-filling nozzle 100, the cylindrical fuel-filling nozzle 100 is inserted into the second pathway 56 and the first pathway 28 of the fuel-filling aperture open-closing device 1. At first, the second valve body 55 is pressed by an end of the fuel-filling nozzle 100, and is rotated against an urging force of the second torsion spring 65, and while opening the second pathway 56, the fuel-filling nozzle 100 is inserted and passed through the second pathway 56. At that time, the second pathway 56 is set in a predetermined diameter so as to prevent an insertion of the fuel-filling nozzle 100 whose outer diameter is larger than that of the second pathway 56.

Figure 6:
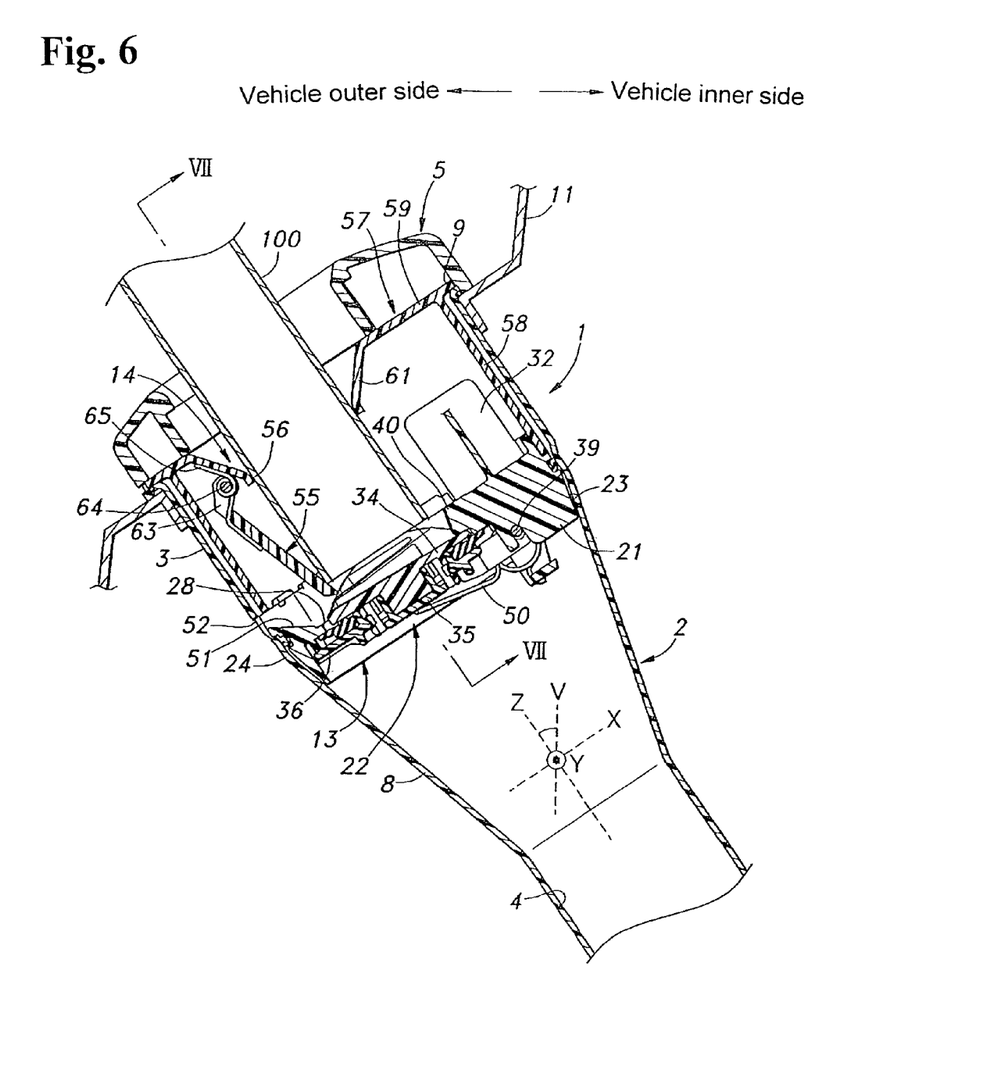
FIG. 6 is a substantial enlarged cross-sectional view showing a state wherein the first valve device of the fuel-filling aperture open-closing device is blocked, and the second valve device is open.
Figure 7:
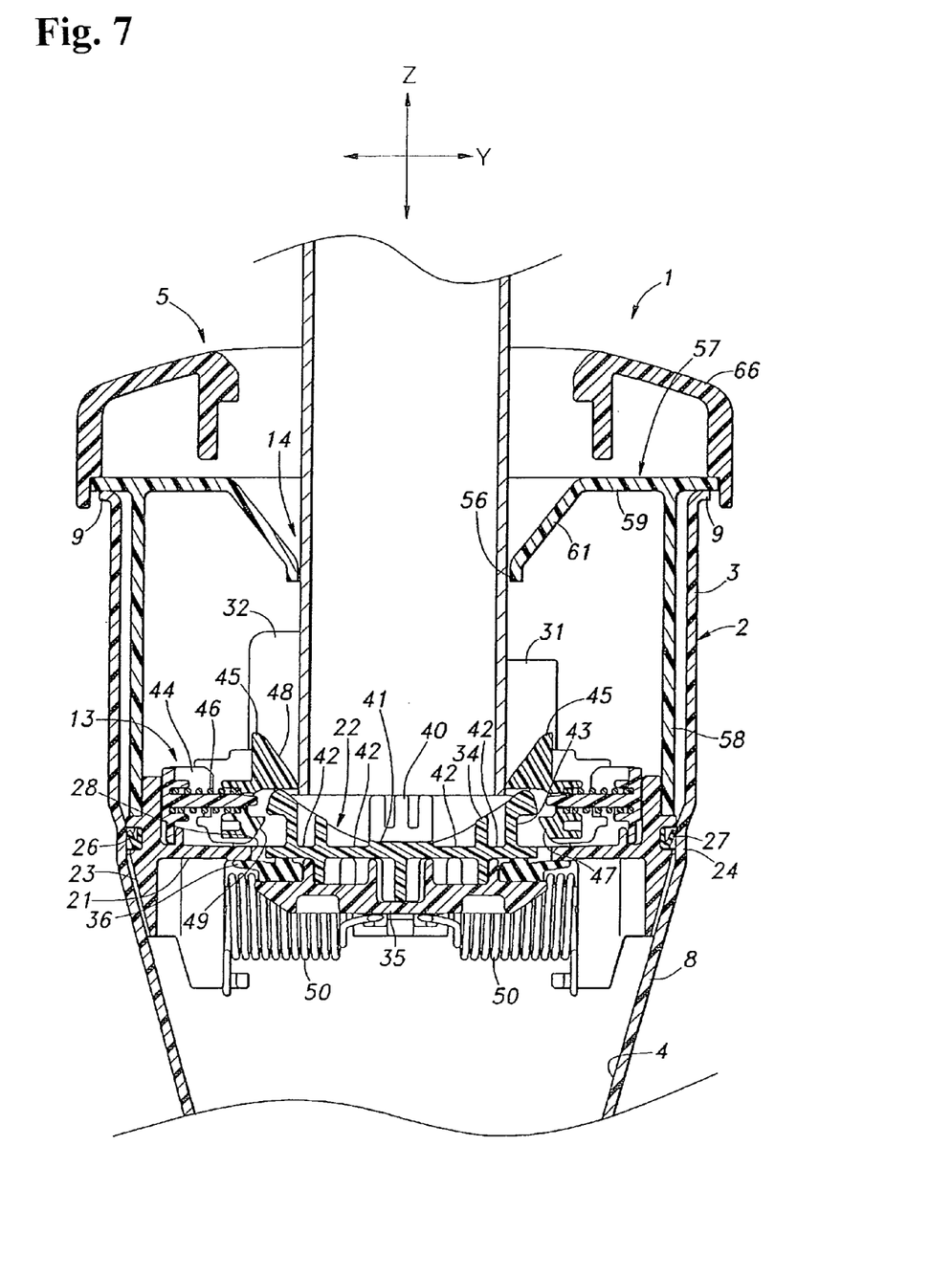
FIG. 7 is a cross-sectional view taken along a line VII-VII in FIG. 6.

When the fuel-filling nozzle 100 is further inserted into an inner end side, the end of the fuel-filling nozzle 100 abuts against the cam portion 48 of the pair of lock members 45. From this state, when the fuel-filling nozzle 100 is further inserted into the inner end side, as shown in FIG. 6 and FIG. 7, the lock member 45 receives a load in the direction entering into the guide groove 44 from the fuel-filling nozzle 100 through the cam portion 48 so as to slide into the guide groove 44 against an urging force of the compression coil spring 46. Thereby, the engagement between the engagement convex portion 47 and the engagement hole 43, i.e., an engagement between the lock member 45 and the first valve body 22 is released so as to allow the rotation of the first valve body 22. Incidentally, in a case wherein the outer diameter of the fuel-filling nozzle 100 is smaller than a predetermined value, both of the pair of lock members 45 cannot move backward into the guide groove 44, so that a lock of the first valve body 22 by the lock member 45 cannot be released. The diameter of the fuel-filling nozzle 100 is controlled to a certain size or less by the second pathway 56, and is controlled to a certain size or above by the pair of lock members 45, so that only the fuel-filling nozzle 100 having a predetermined diameter can open the fuel-filling aperture open-closing device 1.

Figure 8:
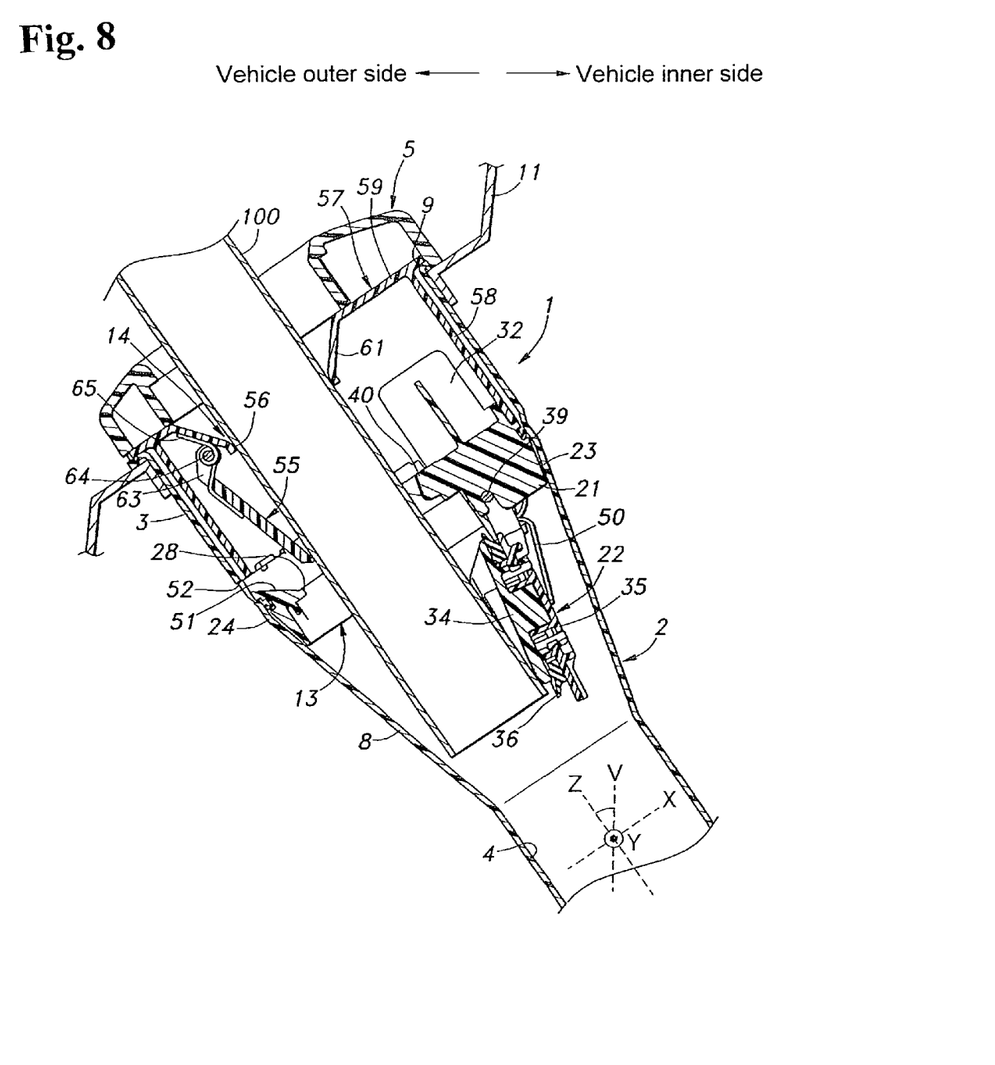
FIG. 8 is a substantial enlarged cross-sectional view showing a state wherein the first valve device and the second valve device of the fuel-filling aperture open-closing device are open.

After the engagement between the pair of lock members 45 and the first valve body 22 is released, when the fuel-filling nozzle 100 is further inserted into the inner end side, as shown in FIG. 8, the fuel-filling nozzle 100 presses the first valve body 22 by the end thereof, rotates the first valve body 22 against an urging force of the first torsion spring 50, and while opening the first pathway 28, the fuel-filling nozzle 100 enters into the first pathway 28. At that time, an extending direction of the discharge groove 42 and a sliding direction of the fuel-filling nozzle 100 on the surface 41 of the first valve body 22 correspond, so that the fuel-filling nozzle 100 smoothly slides on the surface 41 without being caught in the discharge groove 42. In a state wherein the end of the fuel-filling nozzle 100 has passed the first pathway 28, filling a fuel is carried out from the fuel-filling nozzle 100.

When the fuel-filling nozzle 100 is pulled out of the fuel-filling aperture open-closing device 1, accompanied by a displacement of the fuel-filling nozzle 100 to an outer end side, the first valve body 22 is urged by the first torsion spring 50, moves to the closed position, and closes the first pathway 28. Also, the pair of lock members 45 receives an urging force of the compression coil spring 46 so as to protrude to the first pathway 28 side, and the engagement convex portion 47 engages with the engagement hole 43 so as to lock the first valve body 22. Then, the second valve body 55 is urged by the second torsion spring 65, moves to the closed position, and closes the second pathway 56 so as to return to the normal state. Incidentally, in a case wherein the fuel-filling nozzle 100 is pulled out quickly, before the first valve body 22 reaches the closed position, the pair of lock members 45 could come to a state protruding into the first pathway 28. However, in that case, the first valve body 22 presses the cam portion 49 of each lock member 45, and moves to the closed position while moving each lock member 45 backward into the guide groove 44. After that, each lock member 45 protrudes again, and the engagement convex portion 47 engages with the engagement hole 43.

An operational effect of the fuel-filling aperture open-closing device 1 according to the present embodiment will be explained. The fuel-filling aperture open-closing device 1 does not include a screw type filler cap such as a conventional fuel-filling aperture, and can open the fuel-filling aperture only by inserting the fuel-filling nozzle 100, so that a fuel-filling operation can be easily carried out. Also, two valves of the first valve device 13 and the second valve device 14 are disposed in series so as to prevent foreign matters such as dust, rainwater, and the like from an outside from entering into the filler pipe 2. Also, the axis line Z of the tube portion 3 of the filler pipe 2 is inclined relative to the vertical line V, and in a portion facing a lower side of a lateral circumferential portion, and corresponding to the outer end side of the base member 21, there are provided the discharge pathway 51 and the discharge hole 52 so as to discharge the foreign matters, which have passed the second valve body 55 and have remained in an outer end side portion of the first valve device 13, to the outside of the filler pipe 2 from the discharge hole 52. Especially, the first valve body 22 includes the discharge groove 42 on the surface 41, so that the foreign matters are appropriately guided to the discharge pathway 51 and a discharge hole 52 side. Due to the aforementioned configurations, the fuel-filling aperture open-closing device 1 can open the second valve body 55 so as to wash the outer end side portion of the first valve device 13 by a water flow and the like.

Also, the first valve body 22 includes the discharge groove 42 on the surface 41, so that when the fuel-filling nozzle 100 opens the first valve body 22, an area wherein the end of the fuel-filling nozzle 100 slidingly contacts with the surface 41 of the first valve body 22 is reduced. Consequently, a possibility that the fuel-filling nozzle 100 completely takes out the foreign matters attached to the surface 41 of the first valve body 22 is reduced so as to prevent the foreign matters from being brought into the inner end side of the first pathway 28 by the fuel-filling nozzle 100.

Figure 9:
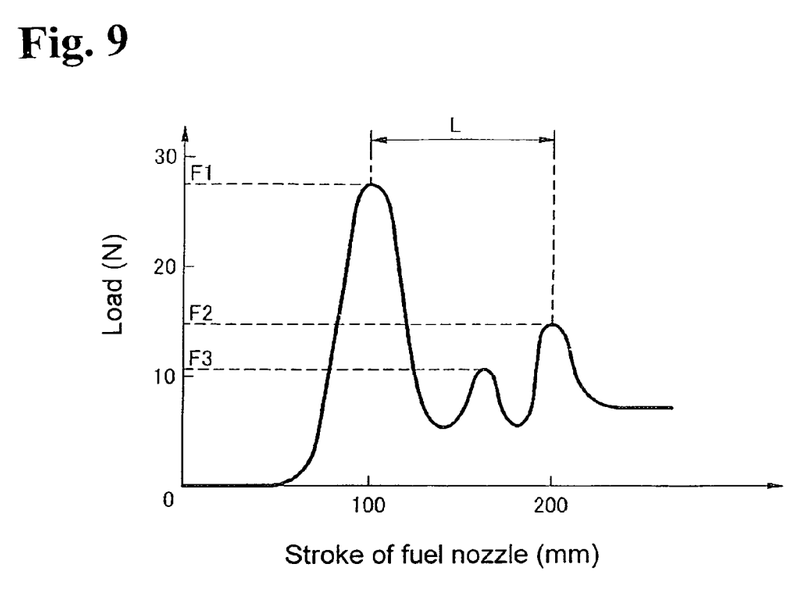
FIG. 9 is a graph showing loads applied to a fuel-filling nozzle when the fuel-filling nozzle is inserted.

FIG. 9 is a graph showing loads where the fuel-filling nozzle 100 receives from the fuel-filling aperture open-closing device 1 when the fuel-filling nozzle 100 is inserted into the fuel-filling aperture open-closing device 1. As shown in FIG. 9, when the fuel-filling nozzle 100 is inserted into the fuel-filling aperture open-closing device 1, given that the loads, where the fuel-filling nozzle 100 receives toward the outer end side in the axis line Z direction from the second valve body 55, the pair of lock members 45, and the first valve body 22, are F1, F2, and F3, ease of opening the second valve body 55, the pair of lock members 45, and the first valve body 22 is set to become F1>F2 and F1>F3. The amounts of the loads, provided to the fuel-filling nozzle 100 from the second valve body 55, the pair of lock members 45, and the first valve body 22, are set mainly by changing spring constants of the second torsion spring 65, the compression coil spring 46, and the first torsion spring 50. By satisfying the aforementioned relationship of the loads F1, F2, and F3, a user (a fuel-filler) can move the pair of lock members 45 backward, and at the same time, can open the first valve body 22, with a momentum of a time when the fuel-filling nozzle 100 is inserted to open the second valve body 55. Namely, a user becomes difficult to sense a resistance of the pair of lock members 45 and the first valve body 22, and by a single inserting operation, the fuel-filling nozzle 100 can be easily opened up to the first valve body 22. Thereby, when a user inserts the fuel-filling nozzle 100, it is difficult to become a condition, wherein the first valve body 22 has not been opened though the second valve body 55 has been opened. Accordingly, it is difficult for filling a fuel, while the first valve body 22 has been closed, i.e., in a state wherein the fuel-filling nozzle 100 has not passed the first pathway 28.

It is preferred that the loads F2 and F3 are one-half or less of the load F1, and it is furthermore preferred that the loads F2 and F3 are one-third or less of the load F1. For example, the load F1 is 20 to 30 N, and the loads F2 and F3 are approximately 10 N.

When the fuel-filling nozzle 100 is inserted into the fuel-filling aperture open-closing device 1, in order to easily open up to the first valve body 22 at once when the second valve body 55 is opened, shorter strokes (moving distances) L of the fuel-filling nozzle 100, up to a position wherein the load F3 is applied from a position wherein the load F1 is applied, are preferred. Also, further preferably, shapes and relative positions of the second valve body 55 and the lock members 45 may be set in such a way that the pair of lock members 45 start to move backward before the second valve body 55 is completely opened.

The explanation of the specific embodiments has been completed here; however, the present invention is not limited to the embodiments described hereinabove, and can be widely modified. For example, the lock members 45 may be omitted in another embodiment.

EXPLANATION OF SYMBOLS

1 ... a fuel-filling aperture open-closing device, 2 ... a filler pipe, 3 ... a tube portion, 4 ... a pathway, 5 ... a valve device assembly body, 11 ... an auto body panel, 13 ... a first valve device, 14 ... a second valve device, 21 ... a base member, 22 ... a first valve body (a valve body), 28 ... a first pathway, 42 ... discharge grooves, 43 ... engagement holes, 45 ... lock members, 46 ... compression coil springs, 47 ... an engagement convex portion, 50 ... a first torsion spring, 51 ... a discharge pathway, 52 ... a discharge hole, 55 ... a second valve body (an auxiliary valve body), 56 ... a second pathway, 65 ... a second torsion spring, 66 ... a garnish, 100 ... a fuel-filling nozzle

What is claimed is:

1. A fuel-filling aperture open-closing device provided in one end of a filler pipe adapted to be communicated with a fuel tank, comprising:
a tube member internally forming a pathway, and connected to one end of the filler pipe in such a way that an axis line thereof has an angle relative to a vertical direction; and
a valve body rotatably provided inside the pathway, blocking the pathway by being constantly urged to an outer end side of the pathway by an urging member, and while opening the pathway when rotating to an inner end side of the pathway against an urging force of the urging member by being adapted to be pressed by a fuel-filling nozzle inserted into the pathway from the outer end side,
wherein the tube member includes a discharge hole communicating an outer surface with an inner surface of the tube member in a portion in which an outer surface of a lateral circumferential portion thereof faces downward, and corresponding to a portion on the outer end side in a closed position of the valve body in an axis line direction of the tube member, and
the valve body includes a plurality of discharge grooves extending toward the discharge hole in a portion on the outer end side.

2. A fuel-filling aperture open-closing device according to claim 1, wherein the tube member is integrally formed with the filler pipe.

3. A fuel-filling aperture open-closing device according to claim 1, wherein from a view in the axis line direction of the tube member, a rotation axis of the valve body is roughly orthogonal to an extending direction of the discharge grooves.

4. A fuel-filling aperture open-closing device according to claim 1, further including an auxiliary valve body rotatably provided on an outer end side relative to the valve body inside the pathway, closing the pathway by being urged to the outer end side of the pathway by another urging member at a normal time, and opening the pathway by rotating to the inner end side of the pathway against an urging force of the another urging member by being adapted to be pressed by the fuel-filling nozzle inserted into the pathway from the outer end side.

\* \* \* \* \*